METHOD FOR MASKING ARTICLES WITH WAX BY CAPILLARY ACTION

Filed April 1, 1965

INVENTORS
FREDERICK S. KAVEGGIA
CARL J. ROSSI
LELAND L. PEART
BY Vincent H. Cleary
ATTORNEY

INVENTORS
FREDERICK S. KAVEGGIA
CARL J. ROSSI
LELAND L. PEART
BY
ATTORNEY

United States Patent Office 3,438,809

Patented Apr. 15, 1969

3,438,809

METHOD FOR MASKING ARTICLES WITH WAX BY CAPILLARY ACTION

Frederick S. Kaveggia, Beverly Hills, Carl J. Rossi, Orange, and Leland L. Peart, San Clemente, Calif., assignors to North American Rockwell Corporation, a corporation of Delaware Filed Apr. 1, 1965, Ser. No. 444,673
Int. Cl. B44d *1/18, 1/52;* B41m *1/12*
U.S. Cl. 117—212 9 Claims

ABSTRACT OF THE DISCLOSURE

The invention is directed toward a method for masking a surface for etching. A mask with the desired design (apertured openings) is placed in light contact with the surface to be etched. The mask is held in position on the surface and the entire assembly is lowered partially into a liquid wax solution such that the surface of the wax does not reach up to the apertured openings. By capillary action the liquid wax seeps up and around the opening. When the opening is surrounded with wax the assembly is removed and the wax is allowed to solidify. The mask is then removed and the solid wax defines accurately the area to be etched. A dye or fluorescent material may be added to the liquid wax to make it easier to see.

The present invention relates to a method for masking and more specifically to a method for applying a layer of wax to a surface.

It is frequently desirable to apply a layer of wax to material (e.g., to etch recesses of predetermined configuration or depth, etc., in materials such as silicon dioxide and single crystal or amorphous (fused silica)). The problem arises, however, that it is difficult to accurately apply a mask such as wax to the surface so as to accurately define the desired shape of a recess. Consequently, predictably etching the same size recesses on many materials such as silicon dioxide is very difficult.

Therefore, an object of the invention is to provide a new and improved method for masking the surface of a piece of material.

Another object of the invention is the provision of a method for preparing the surface of the material such as silicon dioxide for etching a predetermined surface configuration on the material.

A still further object of the invention is to provide a method for masking the surface of a wafer of silicon dioxide so as to enable the accurate etching of a recess or aperture in the surface of the silicon dioxide.

In practicing the present invention, a mask is placed in relatively light contact with the surface of a wafer of material such as silicon dioxide. If the material is to be etched, the mask should be made of an acid resistant material such as iridium, platinum, etc., and have an aperture therein of a predetermined size or configuration. In this relationship with the mask in contact with the surface of the material, the assembly is then immersed in liquid wax up to a depth below the aperture in the mask. This assembly is held in the liquid wax for an optimum time interval so that the capillary action of the wax results in the wax seeping upwardly between the mask and the material. It has been found that by this method, the wax through its capillary action will surround the aperture and be accurately positioned on the edges of the aperture in the mask. An additional feature of the present invention is that the above described wax has a fluorescent quality so that it can easily be determined in the dark with ultraviolet light when the wax reaches the edges of the aperture. This enables removing of the assembly from the liquid wax at an optimum time when the wax has reached the edges of the aperture of the mask and before the wax seeps out onto the material in an area with the aperture. In addition, this fluorescence enables easy detection of the wax in this area so as to enable detection of defective pieces.

Other objects and advantages of the invention will be realized with the reading of the specification taken in conjunction with the drawings in which.

Figure 2:
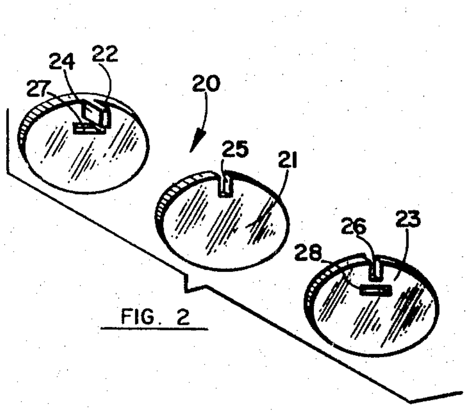
FIG. 2 illustrates an isometric layout of the work piece and masking assembly utilized in a method embodying the invention.

Referring to the drawing and more specifically to FIG. 2 wherein is illustrated a sandwich type assembly for mounting a piece of material to be etched. A piece of silicon dioxide 21 either single crystal or amorphous is employed which has a rectangular slot 25 extending radially thereof. Two acid resistant masks 22 and 23 are employed having rectangular slots 27 and 28 extending therethrough. These masks are made of some type of highly acid resistant material such as iridium, gold plated stainless steel, etc. The recesses 27 and 28 define the area to be etched on the surfaces of the wafer 21. The mask member 22 has a key or tab 24 extending perpendicular outwardly therefrom which has a rectangular cross-section similar in shape to the slot 25 of wafer 21 and the slot 26 of mask 23. This sandwich is then formed so that the member 24 which is perpendicular to the surface of disc 22, extends through slots 25 and 26. A simple spring bias prong or clip is utilized to hold the sandwich assembly 20 in place. This spring type clip is illustrated by numeral 32 in FIG. 3. The pressure on the clip is just slightly greater than that required to hold the three members 22, 21 and 23 in contact and so as to support the members. More specifically, only a minimum of pressure is employed in the method embodying the invention.

Figure 3:
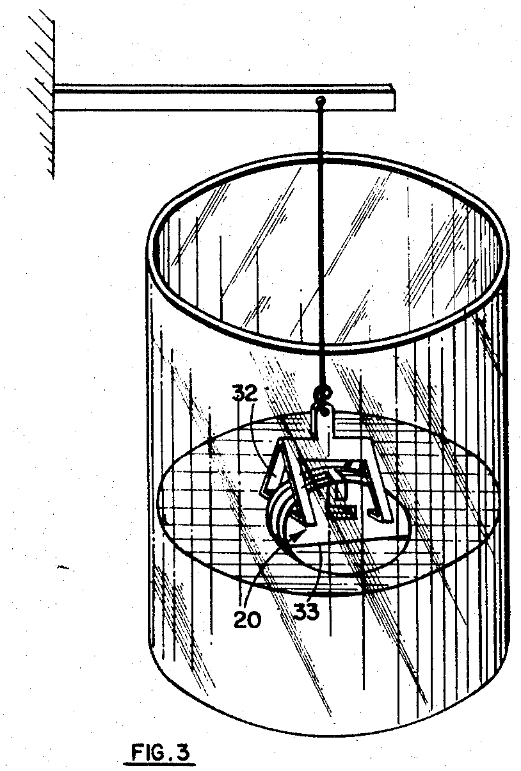
FIG. 3 illustrates a step in an embodiment of the invention in which the assembly in FIG. 2 is immersed in a wax.
Figure 4:
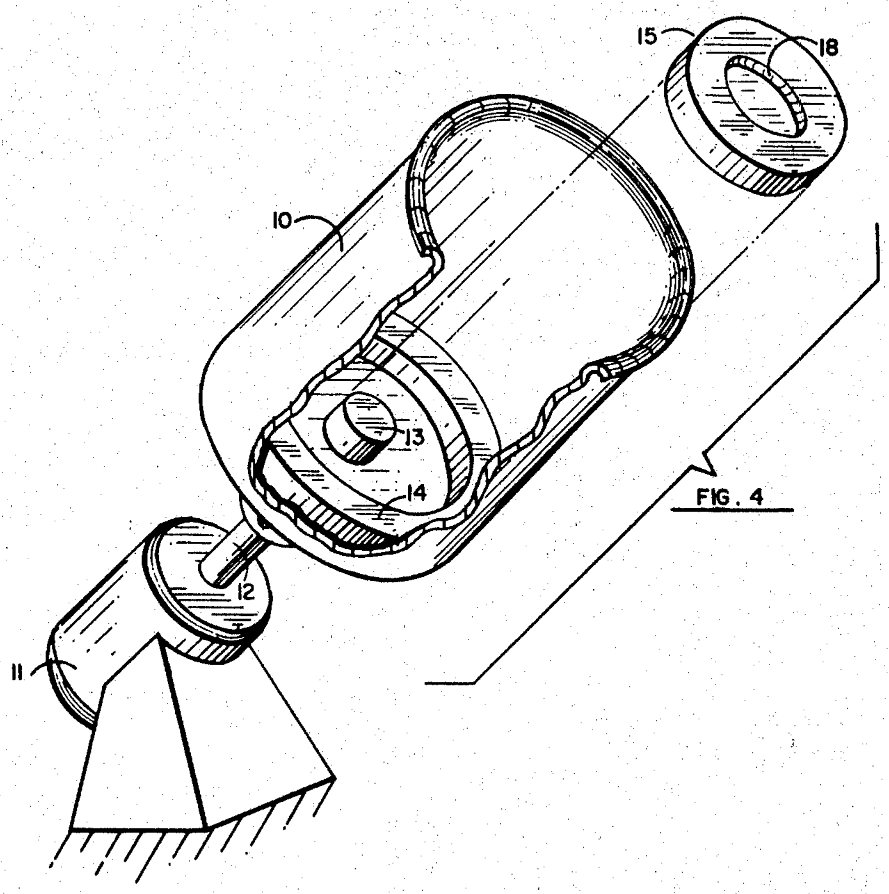
FIG. 4 illustrates a device which can be used after a work piece has been prepared by the method embodying the invention.

A solution of wax is melted and is shown in a beaker in FIG. 3. The sandwich assembly of FIG. 2 is dipped into this wax which preferably contains a fluorescent dye. In the method disclosed, the sandwich is held in the liquid wax so that the upper surface of the wax on the sandwich, illustrated as 33 in FIG. 3, is considerably below the slots 27 and 28. The sandwich is held as shown in FIG. 3 for a sufficient time so that by the capillary action of the wax a coating of wax seeps upwardly on the disc 21 to the lower edge of rectangles 27 and 28, upwardly on the side of the rectangles 27 and 28 finally on the upper edge of the rectangles 27 and 28 so as to completely cover the area between discs 22 and 23 and the corresponding surfaces of disc 21. In order to obtain the proper amount of coating by this capillary action, one method is to utilize the fluorescent dye in the wax in a darkened room so as to periodically observe the edges of the recesses 27 and 28 and the circular edges of members 21, 22 and 23. When the dye can be seen at all these edges, there is a sufficient coating of wax between the members. In addition, if any of the wax does come out onto the surface of member 21 within the recesses 27 and 28, the fluorescent dye will so indicate. As a result, the member can either be discarded as a defect prior to etching or the wax removed from the surface. After the proper amount of capillary action by the above steps, the assembly 20 is removed from the beaker of liquid wax and the wax is allowed to harden at the cooler temperatures. Subsequently, etching can be performed by rotating it in an etchant of the beaker shown in FIG. 4. The specific processes which utilize the beaker 10 shown in FIG. 4 is disclosed in patent application Ser. No. 409,264, now Patent 3,383,255 entitled Planar Etching of Fused Silica, in the name of Kurt H. Nelson et al., and assigned to North American Aviation, Inc.

Figure 1:
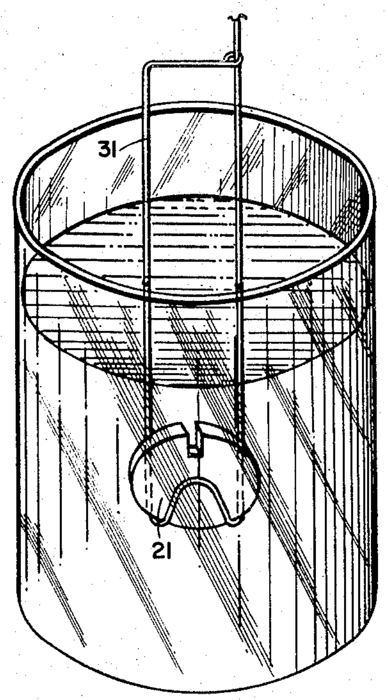
FIG. 1 illustrates a step which can be employed in an embodiment of the invention.

Referring to FIG. 1, prior to the above steps of masking, under certain circumstances, advantages can be obtained in the above method by dipping the wafer 21 in a solution of dichlorodimethylsilane or any similar protective glass coating material which makes the surface wetting resistant to the wax proper. A loop of wire 31 may be used to hold the wafer 21. This pretreatment helps prevent the wax from spreading over the recessed areas 27 and 28 out in the metal mask by confining the capillary action between the metal mask and the quartz. Better definitions of the recessed areas 27 and 28 are sometimes obtained by this method.

In a preferred mode of the method disclosed above, a solution of 24 grams of Ceresin wax is mixed with 6 grams of paraffin wax, 18 grams of beeswax, and ½ gram of any oil soluble fluorescent dye such as Azosol, brilliant yellow 8–GL, from American Cyanamid Company, etc.

With the above ingredients, the wax was heated at atmospheric pressure to 75 degrees centigrade. The members 22 and 23 were made of iridium. The member 21 was an amorphous silicon dioxide that was one inch in diameter by 30 mils thick.

The disc assembly 20 was held in light contact in this solution for approximately 3–4 minutes at which time the fluorescent dye indicated sufficient capillary action by the wax had occurred. The assembly was then removed from the solution and cooled at room temperature until the wax solidified. The assembly was then placed in the etchant and etched as described in the above co-pending application. The wax and the mask were sufficiently acid resistant so that the recesses corresponding to apertures 27 and 28 were accurately defined.

Although the device of this invention has been described in detail above, it is not intended that the invention should be limited by the description but only by the spirit and scope of the appended claims.

We claim:

1. A method of masking the surface of a piece of metal, silicate or semiconductor material comprising mounting a mask having at least one aperture area defined therein to provide contact between a surface of said mask and the surface of said material, said contact being sufficiently light to permit capillary action of wax between said surfaces, the surface of said mask having an area outlining said desired aperture not in contact with the surface of said material, immersing said piece of material and said mask so mounted in liquid wax with said outlined aperture not immersed in said wax, observing the capillary action of said liquid wax and removing said material and said mask to allow said wax to solidify when said wax reaches around but not into said defined aperture area.

2. A method of masking a surface of metal, silicate or semiconductor material comprising mounting a mask in contact with said surface, said contact being sufficiently light to permit capillary action of wax between said surface and the surface of said mask, the surface of said mask having portions not in contact with said surface, immersing said surface and said mask as mounted in liquid wax up to a level below said portions, observing the capillary action of said liquid wax and removing said surface and said mask to allow said wax to solidify when said wax reaches around but not into said portions.

3. A method of masking the surface of a piece of metal, silicate or semiconductor material comprising mounting an acid resistant mask in contact with the surface of said material, said contact being sufficiently light to permit capillary action of wax between said surfaces, the surface of said mask having portions not in contact with said material and immersing said piece of material and said mask as mounted in a fluorescent liquid wax up to a level below said portions, observing the capillary action of said fluorescent liquid wax and removing said mask and material from said liquid wax so as to allow said wax to solidify when said fluorescent wax is observed around but not into said portions.

4. A method of masking the surface of a silicon dioxide wafer comprising mounting an acid resistant mask to provide contact between the surface of said mask and the surface of said wafer, said contact being sufficiently light to permit capillary action of wax between said surfaces, said surface of said mask having apertures therein to provide portions not in contact with the surface of said wafer, immersing said wafer and said mask as mounted in a fluorescent liquid wax to a level below said portions, removing said mask and said wafer from said wax so as to allow said wax to solidify when said fluorescent liquid wax is observed around but not in said apertures.

5. A method of masking the surface of a wafer of silicon dioxide comprising forming a sandwich with said wafer and an acid resistant mask to provide contact sufficiently light to permit capillary action of wax therebetween, said mask having at least one aperture defined therein of a predetermined configuration and design, immersing said sandwich in a bath of liquid wax to a depth which does not reach said apertures, removing said sandwich from said liquid wax to allow said wax to solidify when said fluorescent liquid wax is observed around but not in said apertures.

6. A method of masking the surface of a wafer of silicon dioxide comprising forming a sandwich of said wafer and an acid resistant mask to provide contact between a surface of said mask and a surface of said wafer sufficiently light to permit capillary action of wax between said surfaces, said mask having at least one aperture defined therein of a predetermined configuration and design, immersing said sandwich in a fluorescent liquid wax mixture up to a level below said aperture, removing said sandwich from said liquid wax and effecting lowering of the temperature of the wax so as to solidify the wax when said fluorescent liquid wax is observed around but not in said apertures.

7. The method of claim 2 further comprising pretreating said surface to be masked by coating it with a wetting resistant material so that said liquid wax will not wet said surface.

8. The method of claim 5 further comprising pretreating the surface of said wafer by coating it with a wetting resistant material so that said liquid wax will not wet said wafer surface.

9. The method of claim 8 wherein said wetting resistant material is a solution of dichlorodimethylsilane and said wafer is dipped in said solution.

References Cited

UNITED STATES PATENTS

| | | | |
|---|---|---|---|
| 154,032 | 8/1874 | Frederici | 156—13 |
| 3,226,255 | 12/1965 | Cieniewicz | 117—212 |

JACOB H. STEINBERG, *Primary Examiner.*

U.S. Cl. X.R.

117—5.5, 38; 156—13, 17, 345